United States Patent [19]

Morgan et al.

[11] 4,081,171
[45] Mar. 28, 1978

[54] SELF-CLEANING FILTER ASSEMBLY FOR SOLENOID-ACTUATED VALVES

[75] Inventors: Norman D. Morgan, Pasadena; Bodo Pilz, Temple City, both of Calif.

[73] Assignee: Clemar Manufacturing Corporation, Azusa, Calif.

[21] Appl. No.: 693,514

[22] Filed: Jun. 7, 1976

[51] Int. Cl.² ............................................. F16k 31/02
[52] U.S. Cl. ..................................... 251/30; 137/549
[58] Field of Search ............. 15/104.01, 104.04; 137/242, 245, 245.5, 244, 549; 251/30

[56] References Cited

U.S. PATENT DOCUMENTS

| | | | |
|---|---|---|---|
| 1,199,350 | 9/1916 | Collin | 137/244 |
| 2,373,654 | 4/1945 | Beekley et al. | 251/30 |
| 2,544,016 | 3/1951 | Getz | 251/30 |
| 2,573,369 | 10/1951 | Snoddy | 251/30 |
| 2,710,162 | 6/1955 | Snoddy | 251/30 |
| 2,882,006 | 4/1959 | Reinecke | 251/30 |
| 3,112,094 | 11/1963 | Nees et al | 251/30 |
| 3,460,798 | 8/1969 | Carsten | 251/30 |
| 3,821,967 | 7/1974 | Sturman et al. | 251/30 |

Primary Examiner—Martin P. Schwadron
Assistant Examiner—G. L. Walton

[57] ABSTRACT

A self-cleaning filter assembly for use in a solenoid-actuated valve of the type having fluid pressure-operated diaphragm to control opening and closing of the valve, the diaphragm operating in response to fluid pressure admitted from the inlet chamber of the valve into a control chamber to maintain the valve in a closed position, and when the fluid pressure in the control chamber is relieved by actuation of the solenoid, to open the valve. The self-cleaning filter assembly filters control fluid admitted to the control chamber, and comprises a filter element cleaned by a brush each time the valve is opened or closed, thereby to prevent clogging of the filter during use.

11 Claims, 4 Drawing Figures

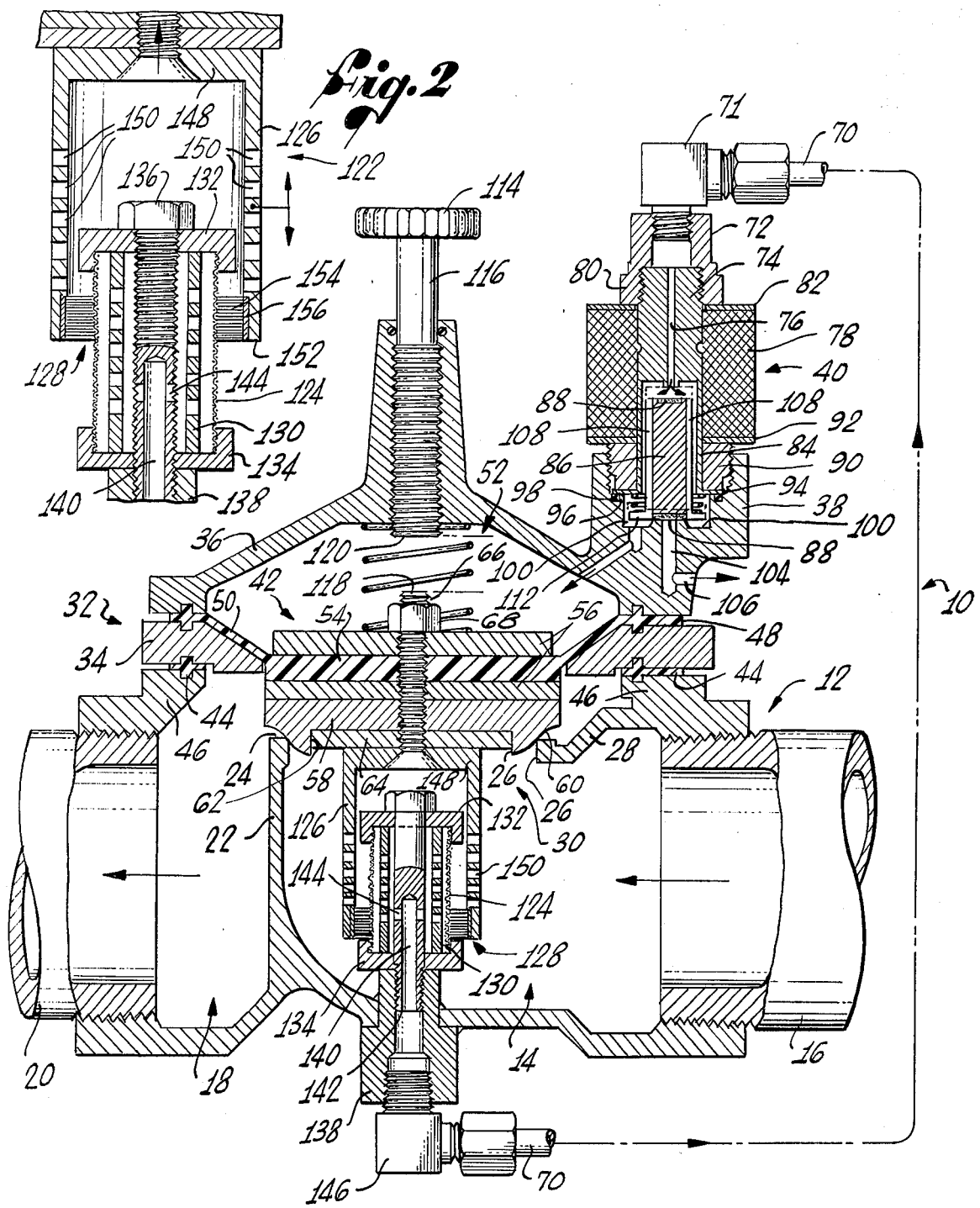

SELF-CLEANING FILTER ASSEMBLY FOR SOLENOID-ACTUATED VALVES

BACKGROUND OF THE INVENTION

This invention relates to solenoid-actuated valves of the type having a fluid pressure-operated diaphragm to control opening and closing of the valve, and has particular reference to a new and improved self-cleaning filter assembly for filtering control fluid used to operate the diaphragm.

Solenoid-actuated valves of the type having a fluid pressure-actuated diaphragm to control opening and closing of the valve have long been known in the art. Typically, such valves include a means for bleeding fluid pressure from the inlet side of the valve to a control chamber where the fluid bled from the inlet acts on the diaphragm to maintain the valve closed, a solenoid being provided to relieve the pressure in the control chamber to effect opening of the valve.

One problem connected with valves of this type is that the bleed passageways through which fluid passes to and from the control chamber are typically relatively small in diameter, and as a result, relatively easily clogged or blocked if dirt, grit, and other deleterious matter is not filtered from the control fluid prior to entering the control passageways. This is particularly true when the valve is used in connection with the operation of sprinklers for irrigation of lands supplied with water from wells, rivers, lakes, and the like.

Various attempts have heretofore been made at solving the problem of filtering the control fluid, typically by providing filters of various types at the inlet to the control fluid passageways or by providing filters in the control fluid passageways. Exemplary of such prior art devices are the filters used in the valves currently marketed by Rain Bird Sprinkler Mfg. Corp. of Glendora Cal. under its model designations E Series Electric Remote Control Valves, Model CP Contamination Proof Electric Valves, and EAV Series Electric Angle and Tee Pattern Remote Control Valves, shown respectively, on pages 50, 51 and 54 of the Rain Bird 1975-1976 Irrigation Equipment Catalogue.

While the filter assemblies used with valves of the above types have met with some success, there still remains a problem of the filter element itself becoming clogged or blocked, and which necessitates periodic disassembly of the valve or filter assembly to clean or replace the filter element. Thus, there exists a need for a filter assembly which is self-cleaning so as to prevent the filter element from becoming clogged or blocked during use, and which need not be periodically removed for cleaning or replacement by a clean filter.

SUMMARY OF THE INVENTION

The present invention provides a new and improved filter assembly which is self-cleaning each time the valve is opened or closed and which functions in a highly reliable and effective manner to ensure that deleterious material is filtered from the control fluid used to operate the diaphragm of the valve.

More specifically, the filter assembly of the invention includes a filter element through which fluid from the valve inlet must pass to flow through the control passageways, and a brush engaging the filter element to clean the filter element with each opening or closing of the valve, the filter element and brush being movable relative to each other. In one embodiment, the brush is coupled with the diaphragm of the valve and sweeps the filter element clean each time the diaphragm moves to open or close the valve, and in a second embodiment, the filter element is coupled for movement with the diaphragm to move along the brush with each opening and closing operation.

In the first embodiment, the filter element, which is cylindrical in shape, is secured to the housing of the valve in the inlet chamber, and the brush, also cylindrical, is mounted on a sleeve surrounding the filter element. The sleeve is coupled to the diaphragm by a centrally disposed bolt, and each time the valve is opened or closed by movement of the diaphragm, the sleeve and its brush translates along the surface of the filter element to sweep substantially the full length of the filter element and remove any dirt or grit particles, as well as other deleterious material which may have accumulated on the filter element.

In the second embodiment, the sleeve carrying the brush is stationarily mounted to the valve housing and surrounds the cylindrical filter element which is coupled by a central shaft to the diaphragm. Each time the diaphragm moves to open or close the valve, the filter element moves along the brush which sweeps the filter element clean.

These and other features and advantages of the present invention will become more apparent from the following detailed description when taken in conjunction with the accompanying drawings which disclose, by way of example, the principles of the present invention.

BRIEF DESCRIPTION OF THE DRAWINGS

FIG. 1 is a fragmentary cross-sectional view of a solenoid-actuated valve embodying a filter assembly in accordance with the present invention;

FIG. 2 is an enlarged fragmentary cross-sectional view of the filter assembly of FIG. 1;

DETAILED DESCRIPTION

Figure 3:
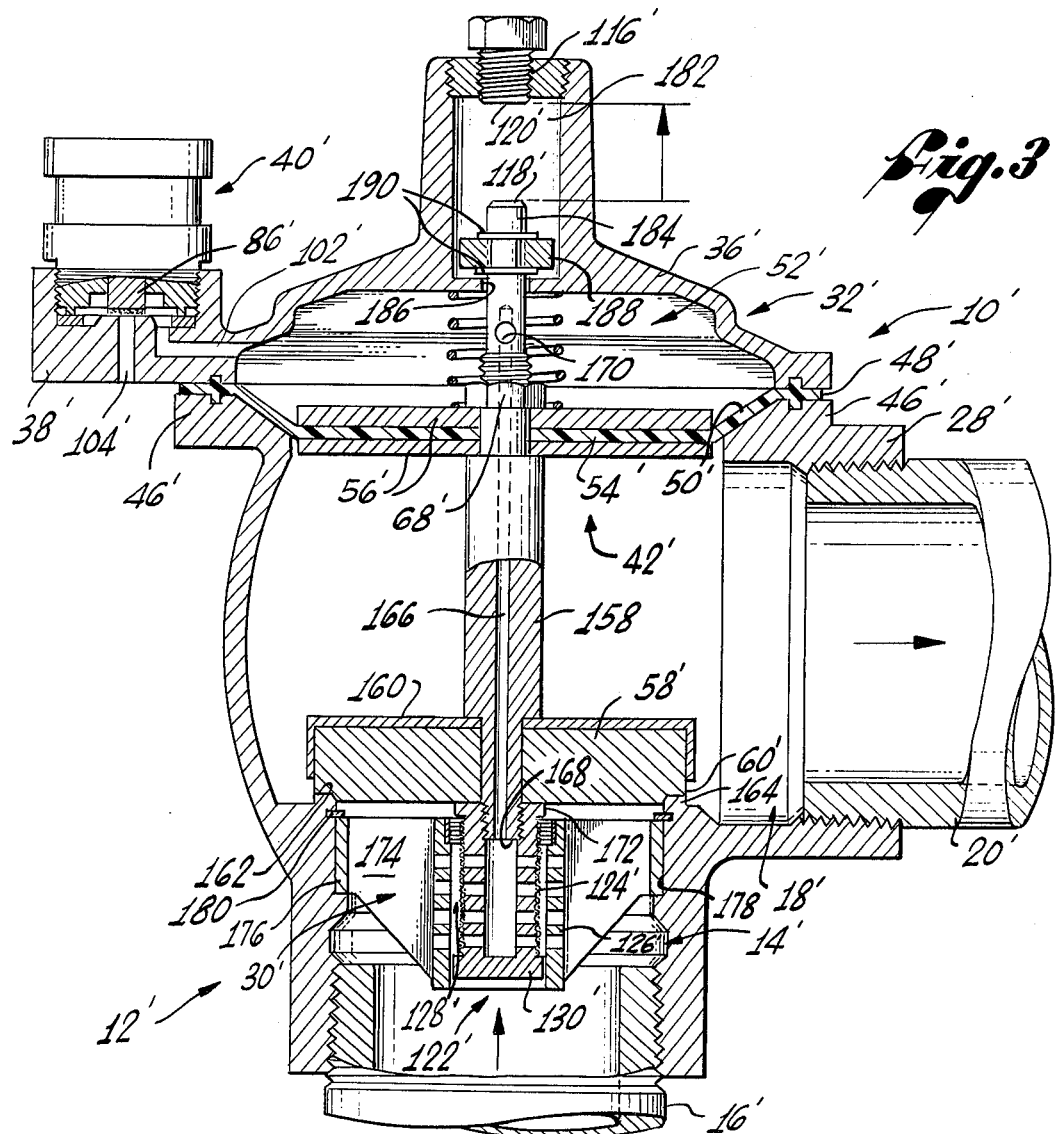
FIG. 3 is a fragmentary cross-sectional view of a second solenoid-actuated valve embodying a filter assembly in accordance with another form of the present invention.

As shown in the exemplary drawings, the present invention is embodied in a solenoid-actuated valve 10 of the type having a fluid pressure operated diaphragm to control opening and closing of a flow passage through the valve. In this instance, referring to the embodiment of FIG. 1, the valve 10, which preferably is made of cast metal or molded plastic, includes a generally tubular-shaped housing 12 having an inlet chamber 14 threadably coupled at one end, the right end in FIG. 1, to a fluid inlet conduit 16, and at the opposite end of the housing, an outlet chamber 18 threadably coupled to an outlet conduit 20 disposed in-line with the inlet conduit.

Within the housing 12 between the inlet and outlet chambers 14 and 18, an upstanding arcuate wall 22 blocks the straight line flow path between the inlet conduit 16 and outlet conduit 20, and has an upper end 24 which cooperates with an arcuate opening 26 in a portion of the upper sidewall 28 of the inlet chamber to define an upwardly opening passageway 30 of circular horizontal cross-section. Thus, for fluid to pass from the inlet conduit 16 to the outlet conduit 20, the fluid must move through the passageway 30 and over the upper end 24 of the arcuate wall 22 into the outlet chamber 18.

Secured by bolts, not shown, to the upper sidewall 28 of the housing 12 and overlying the passageway 30, is a bonnet 32, herein comprising a generally circular ring 34 and a dome-shaped cover 36. The cover 36 of the bonnet 32 includes an upstanding support 38 for mounting an electrically-actuated solenoid assembly 40, and cooperates with the ring 34 to support a diaphragm valve assembly 42 and to provide a fluid seal between the bonnet and the housing 12, a flanged seal ring 44 being clamped between the bottom of the ring and a circular flange 46 upstanding from the upper sidewall 28 of the housing.

To support the diaphragm valve assembly 42, and to provide a fluid seal between the ring 34 and cover 36 of the bonnet 32, the peripheral edge portion 48 of an elastic diaphragm 50 forming part of the assembly is clamped between the top of the ring and the underside of the cover. An internal, generally dome-shaped control chamber 52 is formed by the cover 36 of the bonnet 32, and receives the diaphragm valve assembly 42 when the diaphragm 50 is moved by fluid pressure from a lowered, closed position, as illustrated in FIG. 1, to a raised, open position.

The diaphragm 50 herein has a thickened center portion 54 of circular cross-section with a pair of rigid reinforcing circular plates 56, preferably of metal, disposed against each face, and is secured to a resilient valve disc 58 having a circular cross-section and an inwardly and downwardly contoured sidewall 60. Disposed in a cylindrical recess 62 in the bottom face of the valve disc 58 is a rigid support plate 64, the stack-up of support plate, valve disc, and reinforced diaphragm 50 being held together by a center bolt 66 and nut 68 to form the diaphragm valve assembly 42.

In the closed position, the valve disc 58 seals the passageway 30 to prevent flow of fluid from the inlet conduit 16 to the outlet chamber 18. To hold the valve disc 58 in the closed position, fluid under pressure is bled from the inlet chamber 14 through a passageway including a control line 70 and the solenoid 40 into the control chamber 52 where the fluid acts against the upper surface of the diaphragm 50.

As can be seen in FIG. 1, the upper surface of the diaphragm 50 is considerably larger in area than the surface area of the valve disc 58 exposed to inlet fluid pressure as defined by the passageway 30 of the housing 12. Since the fluid within the control chamber 52 is bled from the inlet chamber 14, the pressure in the control chamber is substantially equal to the fluid pressure in the inlet chamber, and, therefore, acts against the larger surface area of the diaphragm 50 to hold the valve disc 58 in the closed position.

To open the valve 10, the solenoid assembly 40 is actuated to close off from the control chamber 52 the fluid in the control line 70, and to bleed the fluid in the control chamber, herein to atmosphere. Still referring to FIG. 1, the control line 70 is attached by a threaded coupling 70 to a tubular fitting 72 secured to the upper end of the solenoid assembly 40 which includes a stationary core 74 having a central flow opening 76 therethrough, and a surrounding coil 78.

The stationary core 74 projects above the top of the coil 78 and is threadably attached to the fitting 72 which includes a flanged bottom portion 80 for clamping an insulating disc 82 between the upper end of the coil and the bottom of the fitting. The lower portion of the stationary core 74 is formed as a cylindrical skirt 84 within which a cylindrical plunger 86 having disc-shaped seal inserts 88 in each end, is mounted for reciprocation between upper and lower positions.

To secure the solenoid assembly 40 to the support 38 of the bonnet 32, an externally threaded ring 90 is disposed around the skirt portion 84 of the core 74 below the coil 78, and is received by corresponding internal threads formed in the support which herein is generally cup-shaped. An insulating disc 92 is disposed between the top of the threaded ring 90 and the bottom of the coil 78 to insulate the coil from the bonnet 32, and the bottom of the threaded ring abuts a radially outwardly flared flange 94 formed on the lower end of the skirt portion 84 of the core 74. The bottom of the flange 94, in turn, abuts a shoulder 96 formed in the support 38 to clamp the solenoid assembly 40 to the bonnet 32, a seal ring 98 being compressed between the bottom of the flange and the shoulder to provide a fluid seal.

Formed in the bottom 100 of the support 38 adjacent one side is a conduit 102 for permitting fluid to flow into and out of the control chamber 52. Centrally disposed in the bottom 100 of the support 38 is a bleed conduit 104 having an exit end 106 open to the atmosphere, and is positioned to be axially aligned with the plunger 86 so that when the plunger is in the lower position, the lower seal insert 88 seats against the entrance to close off the bleed conduit.

When in the lower position, as illustrated in FIG. 1, the plunger 86 permits fluid to flow from the control line 70 through the flow opening 76 and the conduit 102 into the control chamber 52. For permitting free fluid flow around the plunger 86, the plunger has longitudinal grooves 108 formed along the side and through which fluid can pass between the plunger and the inside sidewall of the skirt portion 84 of the core 74.

To ensure that the plunger 86 remains in the lower position when the valve 10 is closed, a spring 110 is disposed around a lower portion of the plunger, and held in place between the underside of the flange 94 of the core 74, and a radially outwardly disposed flange 112 formed on the lower end of the plunger. In this manner, as long as the coil 78 of the solenoid assembly 40 is not actuated, the plunger 86 will seal the bleed conduit 104 and permit fluid from the inlet chamber 14 at substantially inlet chamber pressure to fill the control chamber 52.

When it is desired to open the valve 10, the coil 78 of the solenoid assembly 40 is activated by electrical means not shown, and pulls the plunger 86 to the upper position where the upper seal insert 88 seats against the outlet of the flow opening 76 through the core 74 to seal that opening and prevent further fluid flow therethrough. In the upper position, the bleed conduit 104 is open to atmosphere, thus permitting the pressurized fluid in the control chamber 52 to flow out of that chamber back through the conduit 102 in the support 38, and then out of the valve 10 through the bleed conduit.

Once the fluid pressure in the control chamber 52 is relieved, fluid pressure in the inlet chamber 14 acting against the exposed lower surface of the valve disc 58 forces the diaphragm valve assembly 42 to move upwardly into the control chamber, thereby opening the passageway 30. To control the extent of the opening of the passageway 30 and hence, the flow through the valve 10, a flow control knob 114 secured to a threaded shaft 116 is centrally mounted in the top 36 of the bonnet 32. Raising and lowering the shaft 116 relative to the bonnet 32 controls the extent to which the diaphragm valve assembly 42 can move upwardly into the control chamber 52 since the upper end 118 of the bolt 66 will engage the lower end 120 of the shaft 116 to prevent further upward movement of the diaphragm valve assembly.

It is important to note that the control line 70 and the various flow passageways through the solenoid assembly 40 and bonnet 32 are relatively small in cross-sectional diameter. For this reason, it is imperative that the fluid admitted into the control line 70 be free of dirt, grit and other deleterious matter which could cause a blockage of the line, or of the various passageways through the solenoid assembly 40 and bonnet 32, and render the valve 10 inoperative.

In accordance with the present invention, a new and improved filter assembly 122 is disposed in the housing 12 of the valve 10, and functions in a highly reliable and effective manner to ensure that dirt, grit and other deleterious matter is filtered from the control fluid admitted to the control line 70. Moreover, with each opening and closing of the valve 10, the filter assembly 122 is cleaned to prevent the build-up of material which could cause the filter to itself become clogged or obstructed.

Toward the foregoing ends, the filter assembly 122 is mounted in the inlet chamber 14, and herein includes a cylindrical filter element 124, typically a 30 to 100 mesh screen, positioned to filter fluid before entering the control line 70, and a sleeve 126 supporting a cleaning brush 128 which surrounds and engages the filter element. The filter element 124 and brush 128 are relatively movable and coupled with the diaphragm valve assembly 42 so that the brush will sweep substantially the full length of the filter element each time the valve 10 is opened or closed.

In the embodiment of FIGS. 1 and 2, the filter element 124 is stationarily mounted in the inlet chamber 14 below the diaphragm valve assembly 42 and passageway 30, and is secured to a portion of the bottom sidewall of the housing 12. Herein, the filter element 124 is supported at its ends around a laterally perforated sleeve 130 of rigid material and which is clamped in position by upper and lower flanged end caps 132 and 134, respectively, held together by an axially extending bolt 136 threaded at its lower end into a centrally bored plug 138 projecting through the bottom sidewall of the housing 12.

To permit fluid from the inlet chamber 14 to flow into the control line 70, the bolt 136 has a longitudinal bore 140 extending from the lower end 142 upwardly to the mid-portion, and which communicates with a pair of laterally directed ports 144 which are open to fluid which has passed through the filter element 124 and the perforated sleeve 130. Thus, to enter the control line 70, the fluid must first pass through the filter element 124 before flowing through the plug 138 and into the control line which is coupled to the plug outside the housing 12 by a suitable threaded fitting 146.

As shown in FIGS. 1 and 2, the sleeve 126 is formed as a cylinder having an upper closed end 148 which is secured to the underside of the valve disc 58 of the diaphragm valve assembly 42 by the bolt 118 which holds that assembly together, and includes a series of laterally directed through holes 150 spaced along the mid and lower portion of the sidewall. Secured to the inside of the sidewall of the sleeve 126 adjacent the lower, open end 152, is the brush 128 which herein comprises a series of radially projecting bristles 154 secured to a backing 156 bonded to the sleeve, and which extend into contact with the outer surface of the filter element 124. It should be noted that the brush 128 could be formed of substantially any material which could be used to wipe the surface of the filter element 124 and remove built-up deleterious matter, one such material that has been found satisfactory being that sold by Minnesota Mining and Mfg. Co. under its trademark "Fibre-Tran".

When the valve 10 is opened by actuation of the solenoid assembly 40, the diaphragm valve assembly 42 raises from the closed position of FIG. 1 toward the open position, and, as illustrated in FIG. 2, carries with it the sleeve 126 and brush 128. As the sleeve 126 is raised by the diaphragm valve assembly 42, the brush 128 moves along the surface of the filter element 124 to sweep away particulate material that may have collected on the filter.

Since the filter assembly 122 is mounted in the inlet chamber 14, fluid moving through the valve 10 when it is open flows around the filter assembly and carries with it to the outlet conduit 20 any material removed from the filter element 124 by the brush 128. Similarly, when the valve 10 is closed, the brush 128 carried by the sleeve 126 moves downwardly over the filter element 124 to sweep off material that may have accumulated on the filter while the valve was open. In this manner, the filter element 124 is constantly cleaned by the action of opening and closing the valve 10 thereby ensuring that the filter remains unblocked at all times and permitting only filtered fluid to enter the control line 70.

Figure 4:
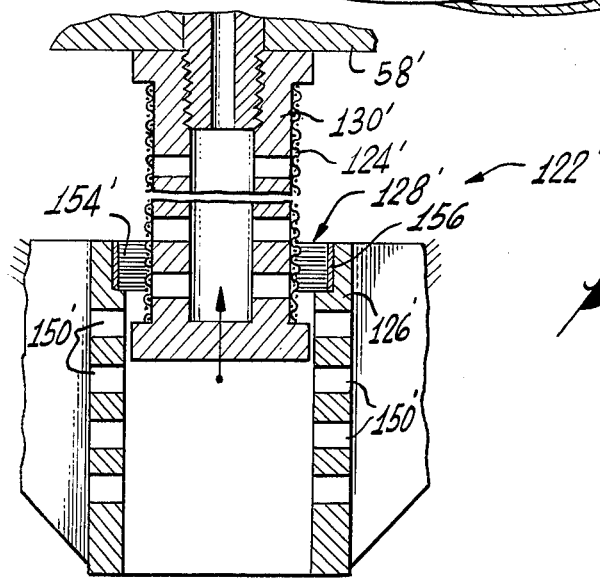
FIG. 4 is an enlarged fragmentary cross-sectional view of the filter assembly of FIG. 3.

In the embodiment of the invention illustrated in FIGS. 3 and 4, the valve 10' includes a self-cleaning filter assembly 122' wherein the sleeve 126' carrying the brush 128' is stationarily mounted, and the filter element 124' moves in response to movement of the diaphragm valve assembly 42'. For ease of understanding, parts of the embodiment of FIGS. 3 and 4 which substantially correspond with parts discussed in connection with the embodiment of FIGS. 1 and 2 have been designated by corresponding primed reference numerals.

As shown in FIG. 3, the filter assembly 122' is disposed in the inlet chamber 14' of the housing 12' which herein is generally L-shaped in cross-section with the outlet chamber 18' being coupled with an outlet conduit 20' extending away from the housing at a right angle with respect to the inlet conduit 16'. The bonnet 32' is secured to the upper sidewall 28' of the housing 12', and, in this instance, comprises a single piece domed cover 36' secured to the housing by bolts, not shown.

To seal the bonnet 32' and housing 12', and mount the diaphragm valve assembly 42', the peripheral edge portion 48' of the diaphgram 58' is clamped between the underside of the bonnet and the top of a circular flange 48' formed around the upper sidewall 28' of the housing. The center portion 54' of the diaphragm 50' is reinforced on each face by rigid plates 56', and the composite is secured to a shaft 158 which extends above the reinforced diaphragm into the control chamber 52', and downwardly below the reinforced diaphragm into the outlet chamber 18'.

Secured around the lower end portion of the shaft 158 is the valve disc 58' which herein has a reinforcing cap 160 over the upper face and sidewall 60', and which seals against a valve seat 162 formed by a cylindrical flange 164 within the housing 12', and defining the passageway 30' through which fluid must pass between the inlet and outlet chambers 14' and 18', respectively. The shaft 158 extends through the valve disc 58' into the inlet chamber 14', and has a centrally located bore 166 extending from the lower end 168 upwardly into the control chamber 52' where a laterally opening port 170 opens the bore to the control chamber.

Fluid in the inlet chamber 14' is free to flow into the control chamber 52' at all times through the bore 166. When the valve 10' is closed, the control chamber 52' contains fluid at substantially inlet chamber pressure, and holds the valve disc 58' in sealing engagement with the valve seat 162 due to the relatively large surface area over which pressure in the control chamber acts on the upper face of the diaphragm 50', as compared with the area of the lower face of the valve disc exposed to inlet pressure by the passageway 30'.

To open the valve 10', the solenoid assembly 40' is actuated to bleed pressurized fluid from the control chamber 62'. Herein, the solenoid assembly 40' includes a coil (not shown) which can be actuated to raise a plunger 86' and open the bleed conduit 104', thereby permitting fluid in the control chamber 52' to flow through the conduit 102' and out of the bleed conduit. Since the control chamber 52' is constantly open to the inflow of fluid through the bore 166 in the shaft 158, typically the bleed conduit 104' communicates downstream of the valve 10' with the outlet conduit 20' so that a constant loss of fluid to atmosphere does not take place while the valve is open.

The cylindrical filter element 124' is herein secured around the outer face of the laterally perforated sleeve 130' which includes a flanged upper end portion 172 threaded to the lower end 168 of the shaft 158 and against the bottom face of the valve disc 58'. The brush 128' is bonded to the upper end portion of its sleeve 126' which is secured in place around the filter element 124' by radial struts 174 extending from a support ring 176 seated in a recess 178 formed around the inside wall of the inlet chamber 14' of the housing 12', a lock ring 180 being snap fit into a groove in the wall to hold the support ring in the recess.

When the valve 10' is opened by actuation of the solenoid 40' to raise the plunger 86' and bleed fluid from the control chamber 52' through the bleed conduit 104', the diaphragm valve assembly 42' raises, thereby moving the filter element 124' upwardly relative to the brush 128'. This permits the brush 128' to wipe the surface of the filter element 124' each time the valve 10' is opened or closed, thereby maintaining the filter element free of deleterious matter which could cause the filter to become clogged or blocked and render the valve inoperative.

For controlling the rate of opening and closing of the valve 10', a cylindrical fluid chamber 182 is formed in the bonnet 36' above the control chamber 52'. The upper end portion 184 of the shaft 158 extends through an enlarged opening 186 in the bottom of the cylindrical chamber 182, and has mounted thereon a piston-like disc 188 which is retained in place by snap rings 190, and has a diameter somewhat less than the inside diameter of the chamber within which it moves.

When the valve 10' is operated to move the diaphragm valve assembly 42' from the lower, closed position to the upper, open position, the piston 188 similarly moves upwardly within the cylindrical chamber 182, and in so doing, displaces fluid from the upper part of that chamber around the edge of the piston to the lower part of the chamber. By controlling the rate at which fluid can displace around the edge of the piston 188, that is, by controlling the diameter of the piston relative to the inside diameter of the cylindrical chamber 182, the rate of movement of the diaphragm valve assembly 42' can be controlled, for example to prevent water hammer.

From the foregoing, it should be appreciated that the present invention provides a new and improved self-cleaning filter assembly 122 particularly adapted for use in a solenoid-actuated valve 10 of the type having a fluid pressure operated diaphragm 50 to control opening and closing of the valve. Moreover, it should also be apparent that the self-cleaning filter assembly 122 operates in a highly reliable and effective manner to clean the filter element 124 each time the valve 10 is opened or closed, and substantially prevents clogging of the filter which could otherwise occur due to the build-up of deleterious material on the filter element.

While several particular embodiments of the invention have been illustrated and described, it should be apparent that various changes and modifications therein can be made without departing from the spirit and scope of the invention as defined in the appended claims.

We claim:

1. In a solenoid-actuated valve of the type including an inlet chamber and an outlet chamber, a diaphragm operated by fluid pressure for opening and closing a valve between the inlet and outlet chambers, a control chamber for receiving control fluid from the inlet chamber, and an electrically-actuated solenoid for controlling the fluid pressure in the control chamber so that in one condition of the solenoid, fluid pressure within the control chamber acts on the diaphragm to maintain the valve closed, and in a second condition, relieves the pressure on the control chamber to permit the diaphragm to deflect into the control chamber to open the valve, the improvement comprising:

a self-cleaning filter assembly disposed in the inlet chamber of the valve, said filter assembly including a filter element through which control fluid from the inlet must flow to the control chamber, and a brush element engaging said filter element, said brush and filter elements being movable one relative to the other, and one of said brush and filter elements being coupled with the diaphragm so that upon movement of the diaphragm between the open and closed positions, said brush element sweeps the surface of said filter element to brush away deleterious material accumulated on said filter element, and the material is carried out of the valve by normal flow from the inlet chamber to the outlet chamber.

2. The improvement as defined in claim 1 wherein said filter element is cylindrical in shape and said brush element is attached to a cylindrical sleeve surrounding said filter element.

3. The improvement as defined in claim 2 wherein said filter element is stationarily mounted within the inlet chamber of the valve, and said sleeve is coupled with the diaphragm for movement therewith relative to said filter element.

4. The improvement as defined in claim 2 wherein said sleeve is stationarily mounted within the inlet chamber of the valve, and said filter element is coupled with the diaphram for movement therewith relative to said sleeve and said brush element.

5. The improvement as defined in claim 1 wherein said filter element comprises a cylindrical screen secured around a laterally perforated sleeve communicating with the control chamber, and said brush element is secured to the inside sidewall of a cylindrical sleeve surrounding said screen, said brush element sweeping substantially the entire effective surface of said screen each time the valve is opened or closed.

6. The improvement as defined in claim 5 wherein said perforated sleeve is stationarily secured in the inlet chamber, and said cylindrical sleeve is coupled to the diaphragm for movement along said screen.

7. The improvement as defined in claim 5 wherein said perforated sleeve is coupled to the diaphragm for movement therewith, and said cylindrical sleeve is stationarily mounted in the inlet chamber such that said screen moves along said brush element.

8. A solenoid-actuated valve comprising:
   a valve housing having an inlet chamber and an outlet chamber;
   valve means disposed between said inlet and outlet chambers and movable between open and closed positions whereby fluid in said inlet chamber respectively communicates with said outlet chamber or is blocked from said outlet chamber;
   a pressure-operated diaphragm coupled with said valve means and operable to move said valve means between said open position and said closed position;
   a control chamber in fluid comunication with said diaphragm and adapted to received pressurized fluid therein;
   passageway means for admitting fluid from said inlet chamber to said control chamber;
   an electrically-actuated solenoid for controlling the pressure of fluid in said control chamber, said solenoid in one condition permitting said pressure in said control chamber to substantially equal the fluid pressure in said inlet chamber and to act on said diaphragm to hold said valve means in the closed position, and in another condition reducing said pressure in said control chamber to below the fluid pressure of said inlet chamber thereby to permit movement of said diaphragm to open said valve means; and
   a self-cleaning filter disposed in said inlet chamber for filtering said fluid admitted to said control chamber through said passageway means, and comprising a filter element and a brush element engaging said filter element, said brush and filter elements being movable one relative to the other, and one of said brush and filter elements being coupled with said valve means so that said brush element cleans said filter element each time said valve means moves between the open and closed positions, and material cleaned from said filter element is carried out of the valve by normal flow from said inlet chamber to said outlet chamber.

9. A solenoid-actuated valve as defined in claim 8 in which:
   said filter element comprises a cylindrical screen and said brush element is attached to a cylindrical sleeve surrounding said filter element.

10. A solenoid-actuated valve as defined in claim 9 wherein said filter element is stationarily mounted within said inlet chamber, and said sleeve is coupled with said valve means for movement therewith relative to said filter element.

11. A solenoid-actuated valve as defined in claim 9 wherein said sleeve is stationarily mounted within said inlet chamber, and said filter element is coupled with said valve means for movement therewith relative to said sleeve and said brush element.

* * * * *